May 22, 1923.

R. E. McLAUGHLIN

SURGE RELIEF DEVICE

Filed July 29, 1921

1,456,391

2 Sheets-Sheet 1

INVENTOR.
R.E. McLAUGHLIN

BY

Victor J. Evans
ATTORNEY.

May 22, 1923.
R. E. McLAUGHLIN
SURGE RELIEF DEVICE
Filed July 29, 1921
1,456,391
2 Sheets-Sheet 2
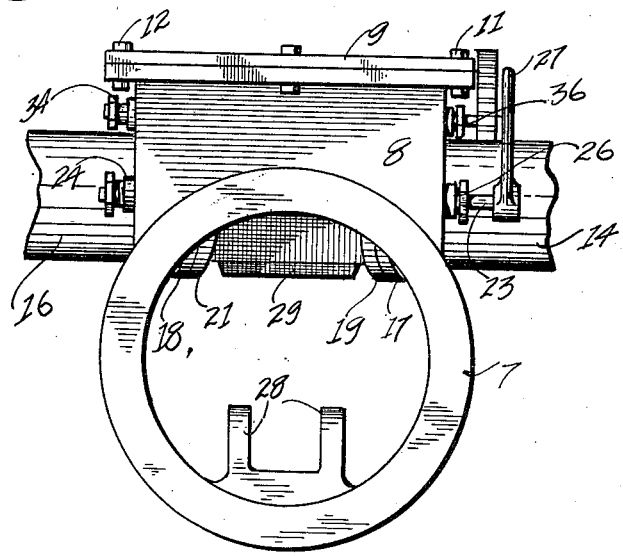
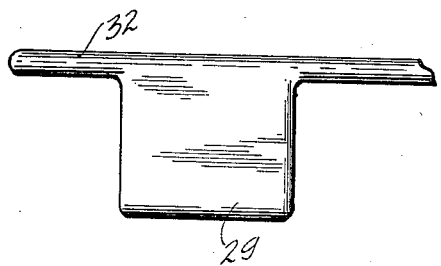
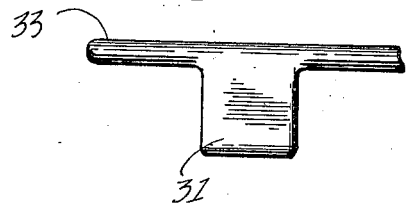
INVENTOR.
R.E. McLAUGHLIN
BY
Victor J. Evans
ATTORNEY.

Patented May 22, 1923.

1,456,391

UNITED STATES PATENT OFFICE.

ROBERT E. McLAUGHLIN, OF TRACY, CALIFORNIA.

SURGE-RELIEF DEVICE.

Application filed July 29, 1921. Serial No. 488,452.

*To all whom it may concern:*

Be it known that I, ROBERT E. McLAUGHLIN, a citizen of the United States, residing at Tracy, in the county of San Joaquin and State of California, have invented new and useful Improvements in Surge-Relief Devices, of which the following is a specification.

This invention relates to improvements in surge relief devices for high head pumps.

The principal object of this invention is to devise means whereby the surging in pipe lines caused by the stopping of the pumps may be relieved thereby preventing hydraulic hammer and its incident damages.

Another object is to produce a device which will be entirely automatic in its action, and one which is very simple to construct.

A further object is to produce means for manually operating the device, should it be desired to do so.

Other objects and advantages will be apparent during the course of the following description.

Figure 1:
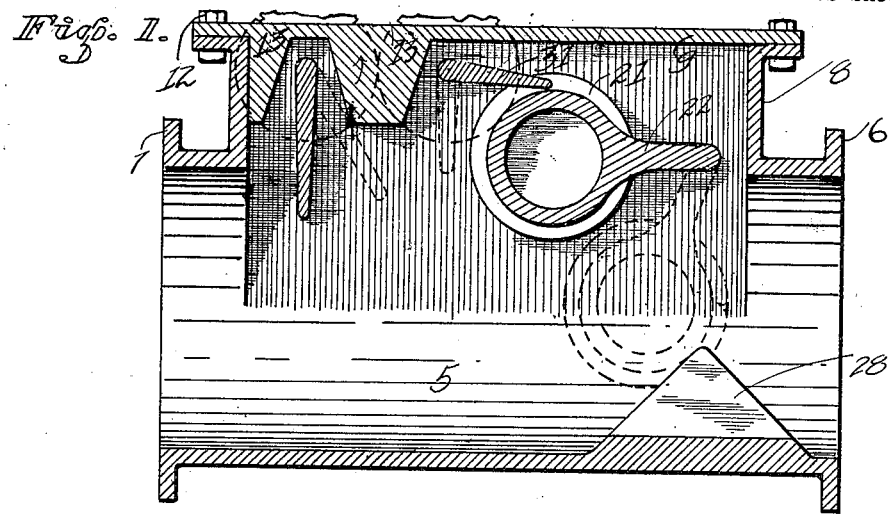
Figure 2:
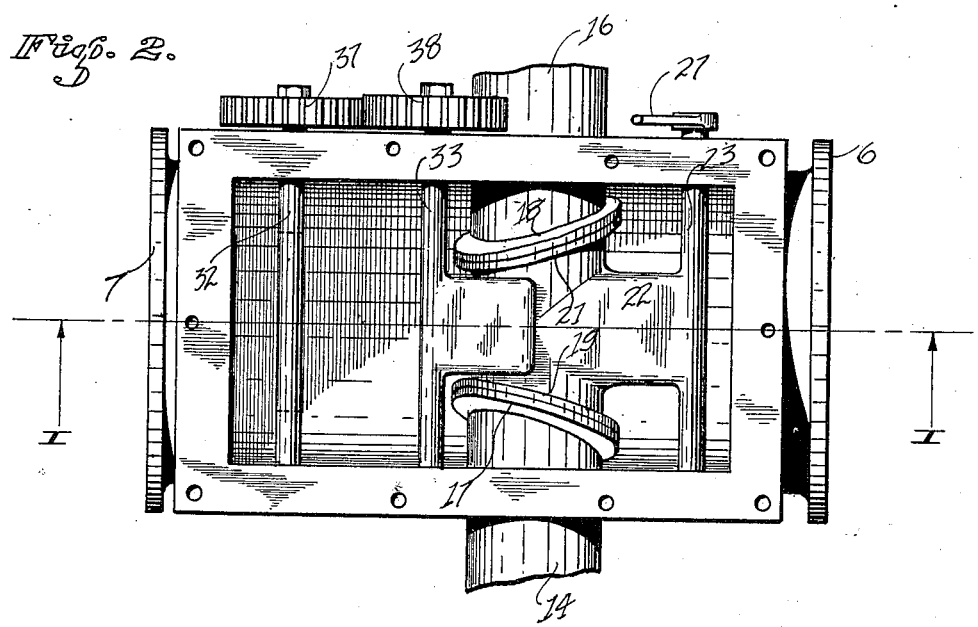

In the accompanying drawings forming a part of this specification and in which like numerals are employed to designate like parts throughout the same, Fig. 1 is a cross section taken on the line 1—1 of Fig. 2, Fig. 2 is a top plan view of my device, Fig. 3 is an end elevation of my device looking in the direction of the arrow "a" of Fig. 2, Figs. 4 and 5 are detail views of operating paddles or veins.

In the pumping of water or any liquid under a high head, there is apt to be a hydraulic pound or hammer, which is harmful to the pipe line, for the reason that it will burst the pipes as will be later described.

It is well known that water moving through a long pipe has considerable inertia, which cannot be stopped the minute the pumps are shut down, with the result that a vacuum is created in the pipe and the water will start to surge, depending upon where the vacuum forms and whether it extends over a considerable length of pipe, or the column breaks. It is this surging that I intend to employ to operate my device, which will allow an additional amount of fluid to flow into the pipe to take the place of this vacuum, thereby relieving the strain upon the pipe and preventing the sudden pressure caused by the water returning after it has overcome the inertia. This returning fluid, without my device, gains some momentum in a reverse direction, which, when the vacuum has been overcome and the pipe is now filled builds up a tremendous pressure, which, in some instances, bursts the pipe in one or more places, and it is to overcome this trouble that I have invented my device.

In the accompanying drawings wherein for the purpose of illustration is shown a preferred embodiment of my invention, the numeral 5 represents a suction pipe, which is especially constructed to accommodate my arrangement of parts, and is provided with flanges 6 and 7. The flange 6 is adapted to be attached to the outlet manifold of a high pressure pump, while the flange 7 is adapted to be attached to the pipe line which, in some instances, is several miles in length.

This suction pipe 5 is provided with an offset rectangular portion 8, having a cover 9 secured thereto as by bolts 11 and 12. The cover 9 is provided with depending portions 13, the purpose of which will be hereinafter described.

Conduits 14 and 16 are provided, which extend through the sides of the offset rectangular portion 8 and are provided with beveled flanged ends, as shown at 17 and 18. These flanged ends are adapted to be contacted by the flanged ends 19 and 21 of a hinged valve 22, which is secured by a suitable shaft 23, extending through the sides of the rectangular shaped offset portion 8. The usual stuffing boxes 24 and 26 are provided, and as their purpose is obvious, no further description is necessary.

A handle 27 is provided upon the end of the shaft 23 so that the valve 22 may be operated manually, if desired. A stop 28 is formed upon the bottom of the pipe 5 and is adapted to be contacted by the valve 22 when in its lowermost position, as shown in dotted lines in Figure 1.

Numerals 29 and 31 refer to operating paddles, each provided with a shaft as shown at 32 and 33. These shafts are each provided with the usual stuffing box as shown at 34 and 36. A gear 37 is secured upon the end of the shaft 32 and a gear 38 is secured upon the end of the shaft 33. These gears are adapted to mesh one with the other and to hold the paddles in their relative position, as shown in Figure 1.

The operation of my device is as follows:—

When water is flowing from the pump through my device, the parts are in their normal position, as shown in full lines. As soon as the pumps are shut down and any surging starts to follow, the paddle is moved to its dotted line position through the action of the water or of the fluid which, through the gearing 37 and 38 causes the paddle 31 to push downwardly upon the hinged valve 22. This immediately separates the seats 19 and 21 from the seats 17 and 18 and allows the water to flow into the pipe from an auxiliary source, which is sufficient to fill the space usually occupied by the vacuum.

Should it be desired to operate the device manually, the handle 27 may be moved in the proper direction, which will force the valve 22 downwardly.

It is to be understood that the form of my invention herewith shown and described, is to be taken as a preferred example of the same, and that various changes in the shape, size and arrangement of parts may be resorted to without departing from the spirit of the invention or the scope of the subjoined claims.

Having thus described my invention, I claim:—

1. In a device of the character described, the combination of a pipe, paddles mounted in said pipe, a valve mounted in said pipe, said paddles adapted to operate said valve for the purpose of admitting an auxiliary fluid to said pipe.

2. In a device of the character described, the combination of a pipe, a chamber formed on said pipe, a valve hingedly mounted in said chamber, and paddles mounted in said chamber and adapted to operate said valve.

3. In a device of the character described, the combination of a pipe, a chamber formed on said pipe, conduits entering said chamber, a valve adapted to engage said conduits, and paddles mounted in said chamber, one of said paddles adapted to engage said valve to cause said valve to move away from said conduits.

4. In a device of the character described, the combination of a pipe, an offset chamber formed on said pipe, conduits entering said chamber, flanged ends formed on said conduits, a valve adapted to be interposed between the ends of said conduits, flanges formed on said valve, and adapted to engage the flanged ends of said conduits, and means for operating said valve.

5. In a surge relief device, a pipe, a chamber formed integral with said pipe, shafts extending through said chamber, paddles integral with said shafts, gears carried at the extremities of said shafts and adapted to mesh one with the other, conduits extending into said chamber and in axial alignment one with the other, and a valve interposed between said conduits and adapted to be moved out of alignment therewith, through the medium of said paddles.

ROBERT E. McLAUGHLIN.